United States Patent
Breed

[19]

[11] Patent Number: 5,809,437
[45] Date of Patent: Sep. 15, 1998

[54] ON BOARD VEHICLE DIAGNOSTIC MODULE USING PATTERN RECOGNITION

[75] Inventor: David S. Breed, Boonton Township, N.J.

[73] Assignee: Automotive Technologies International, Inc., Denville, N.J.

[21] Appl. No.: 476,077

[22] Filed: Jun. 7, 1995

[51] Int. Cl.[6] .......................... G01M 17/00; G06F 11/00
[52] U.S. Cl. ................ 701/29; 701/34; 701/35; 701/45; 364/551.01; 73/117.3
[58] Field of Search ............. 364/424.03, 424.04, 364/424.05, 431.11, 551.01, 508; 340/439, 459, 521; 395/20, 21, 23, 913, 905; 73/116, 117.3; 701/29, 35, 40, 44, 45, 34, 39, 43

[56] References Cited

U.S. PATENT DOCUMENTS

| | | | |
|---|---|---|---|
| 4,128,005 | 12/1978 | Arnston et al. ........................ | 73/117.3 |
| 4,418,388 | 11/1983 | Allgor et al. ...................... | 364/431.01 |
| 4,817,418 | 4/1989 | Asami et al. ............................ | 73/118.1 |
| 5,041,976 | 8/1991 | Marko et al. ....................... | 364/424.03 |
| 5,313,407 | 5/1994 | Tiernan et al. .......................... | 364/508 |
| 5,325,082 | 6/1994 | Rodriguez ................................ | 340/438 |
| 5,333,240 | 7/1994 | Matsumoto et al. ...................... | 395/23 |
| 5,400,018 | 3/1995 | Scholl et al. ........................ | 340/825.54 |
| 5,406,502 | 4/1995 | Haramaty et al. ................. | 364/551.01 |
| 5,442,553 | 8/1995 | Parrillo ............................... | 364/424.04 |
| 5,481,906 | 1/1996 | Nagayoshi et al. ....................... | 73/116 |

OTHER PUBLICATIONS

Liubakka et al., "Failure Detection Algorithms Applied to Control System Designs for Improved Diagnositcs and Reliability", SAE Technical Paper Series, Jan. 29 to Mar. 4, 1988, pp. 1–7.

James et al., "Microprocessor Based Data Acquistion for Analysis of Engine Performace", SAE Technical Paper Series, Feb. 23–27, 1987, pp. 1–9.

*Primary Examiner*—Tan Q. Nguyen

[57] ABSTRACT

A component diagnostic system for a motor vehicle having at least one component which emits a signal having a pattern containing information as to whether that component is operating normally or abnormally. The system includes at least one sensor which senses the signal and outputs an electrical signal representative thereof and corresponding to the pattern, a processor coupled to the sensor(s) for processing the electrical signal and determining if the pattern is characteristic of abnormal state of operation of the component, and an output device coupled to the processor for affecting a another system within the vehicle if the component is operating abnormally. The processor preferably is a pattern recognition system.

20 Claims, 4 Drawing Sheets

ON BOARD VEHICLE DIAGNOSTIC MODULE USING PATTERN RECOGNITION

BACKGROUND OF THE INVENTION

Every automobile driver fears that his or her vehicle will breakdown at some unfortunate time, e.g., when he or she is traveling at night, during rush hour, or on a long trip away from home. To help alleviate that fear, certain luxury automobile manufacturers provide roadside service in the event of a breakdown. Nevertheless, the vehicle driver must still be able to get to a telephone to call for service. It is also a fact that many people purchase a new automobile out of fear of a breakdown with their current vehicle. This invention is primarily concerned with preventing breakdowns and with minimizing maintenance costs by predicting component failure which would lead to such a breakdown before it occurs.

When a vehicle component begins to fail, the repair cost is frequently minimal if the impending failure of the component is caught early but increases as the repair is delayed. Sometimes if a component in need of repair is not caught in a timely manner, the component, and particularly the impending failure thereof, can cause other components of the vehicle to deteriorate. One example is where the water pump fails gradually until the vehicle over heats and blows a head gasket. It is desirable, therefore, to determine that a vehicle component is about to fail as early as possible so as to minimize the probability of a breakdown and the resulting repair costs.

There are various gages on an automobile which alert the driver to various vehicle problems. For example, if the oil pressure drops below some predetermined level, the driver is warned to stop his vehicle immediately. Similarly, if the coolant temperature exceeds some predetermined value, the driver is also warned to take immediate corrective action. In these cases, the warning often comes too late as most vehicle gages alert the driver after he or she can comfortably solve the problem. Thus, what is needed is a component failure warning system which alerts the driver to the impending failure of a component long before the problem gets to a catastrophic point.

Some astute drivers can sense changes in the performance of their vehicle and correctly diagnose that a problem with a component is about to occur. Other drivers can sense that their vehicle is performing differently but they don't know why or when a component will fail or how serious that failure will be. The invention disclosed herein will, in most cases, solve this problem by predicting component failures in time to permit maintenance and thus prevent vehicle breakdowns.

Presently, automobile sensors in use are based on specific predetermined levels, such as the coolant temperature or oil pressure, whereby an increase above the set level or a decrease below the set level will activate the sensor, rather than being based on changes in this level over time. The rate at which coolant heats up, for example, can be an important clue that some component in the cooling system is about to fail. There are no systems currently on automobiles to monitor the numerous vehicle components over time and to compare component performance with normal performance. Nowhere in the vehicle is the vibration signal of a normally operating front wheel stored, for example, or for that matter, any normal signal from any other vehicle component. Additionally, there is no system currently existing on a vehicle to look for erratic behavior of a vehicle component and to warn the driver or the dealer that a component is misbehaving and is therefore likely to fail in the very near future.

OBJECTS AND SUMMARY OF THE INVENTION

Accordingly, it is an object of the present invention to solve the above problems by monitoring the patterns of signals emitted from the vehicle components and, through the use of pattern recognition technology, forecasting component failures before they occur. Vehicle component behavior is monitored over time in contrast to currently used systems which merely wait until a serious condition occurs.

It is another object of the present invention to provide a new and improved on-board vehicle diagnostic module utilizing pattern recognition technologies which are trained to differentiate normal from abnormal component behavior. In this manner, the problems discussed above, as well as many others, are alleviated by the vehicle diagnostic module described in the paragraphs below.

The diagnostic module in accordance with the invention utilizes information which already exists in signals emanating from various vehicle components along with sensors which sense these signals and, using pattern recognition techniques, compares these signals with patterns characteristic of normal and abnormal component performance to predict component failure earlier than would otherwise occur if the diagnostic module was not utilized. If fully implemented, this invention is a total diagnostic system of the vehicle. In most implementations, the module is attached to the vehicle and electrically connected to the vehicle data bus where it analyzes data appearing on the bus to diagnose components of the vehicle.

Principal objects and advantages of this invention are thus:

1. To prevent vehicle breakdowns.
2. To alert the driver of the vehicle that a component of the vehicle is functioning differently than normal and might be in danger of failing.
3. To alert the dealer, or other repair facility, that a component of the vehicle is functioning differently than normal and is in danger of failing.
4. To provide an early warning of a potential component failure and to thereby minimize the cost of repairing or replacing the component.
5. To provide a device which will capture available information from signals emanating from vehicle components for a variety of uses such as current and future vehicle diagnostic purposes.
6. To provide a device which uses information from existing sensors for new purposes thereby increasing the value of existing sensors and, in some cases, eliminating the need for sensors which provide redundant information.
7. To provide a device which is trained to recognize deterioration in the performance of a vehicle component based on information in signals emanating from the component.
8. To provide a device which analyzes vibrations from various vehicle components which are transmitted through the vehicle structure and sensed by existing vibration sensors such as vehicular crash sensors used with airbag systems.
9. To provide a device which provides information to the vehicle manufacturer of the events leading to a component failure.
10. To apply pattern recognition techniques based on training to diagnosing potential vehicle component failures.

Other objects and advantages of the present invention will become apparent from the following description of the preferred embodiments taken in conjunction with the accompanying drawings.

BRIEF DESCRIPTION OF THE DRAWINGS

The following drawings are illustrative of embodiments of the invention and are not meant to limit the scope of the invention as encompassed by the claims.

DESCRIPTION OF THE PREFERRED EMBODIMENTS

For the purposes herein the following terms are defined as follows:

The term "component" refers to any part or assembly of parts which is mounted to or a part of a motor vehicle and which is capable of emitting a signal representative of its operating state. The following is a partial list of general automobile and truck components, the list not being exclusive:
engine;
transmission;
brakes and associated brake assembly;
tires;
wheel;
steering wheel;
water pump;
alternator;
shock absorber;
wheel mounting assembly;
radiator;
battery;
oil pump;
fuel pump;
air conditioner compressor;
differential gear;
exhaust system;
fan belts;
engine valves;
steering assembly; and
engine cooling fan assembly.

The term "sensor" refers to any measuring or sensing device mounted on a vehicle or any of its components including new sensors mounted in conjunction with the diagnostic module in accordance with the invention. A partial, non-exclusive list of common sensors mounted on an automobile or truck is:
airbag crash sensor;
microphone;
coolant thermometer;
oil pressure sensor;
oil level sensor;
air flow meter;
voltmeter;
ammeter;
humidity sensor;
engine knock sensor;
oil turbidity sensor;
throttle position sensor;
wheel speed sensor;
tachometer;
speedometer;
oxygen sensor;
pitch and roll sensor;
clock;
odometer;
power steering pressure sensor;
pollution sensor;
fuel gauge;
cabin thermometer;
transmission fluid level sensor;
yaw sensor;
coolant level sensor;
transmission fluid turbidity sensor;
break pressure sensor; and
coolant pressure sensor.

The term "signal" herein refers to any time varying output from a component including electrical, acoustic, thermal, or electromagnetic radiation, or mechanical vibration.

Sensors on a vehicle are generally designed to measure particular parameters of particular vehicle components. However, frequently these sensors also measure outputs from other vehicle components. For example, electronic airbag crash sensors currently in use contain an accelerometer for determining the accelerations of the vehicle structure so that the associated electronic circuitry of the airbag crash sensor can determine whether a vehicle is experiencing a crash of sufficient magnitude so as to require deployment of the airbag. This accelerometer continuously monitors the vibrations in the vehicle structure regardless of the source of these vibrations. If a wheel is out of balance, or it there is extensive wear of the parts of the front wheel mounting assembly, or wear in the shock absorbers, the resulting abnormal vibrations or accelerations can, in many cases, be sensed by the crash sensor accelerometer.

Every component of a vehicle emits various signals during its life. These signals can take the form of electromagnetic radiation, acoustic radiation, thermal radiation, vibrations transmitted through the vehicle structure, and voltage or current fluctuations, depending on the particular component. When a component is functioning normally, it may not emit a perceptible signal. In that case, the normal signal is no signal, i.e., the absence of a signal. In most cases, a component will emit signals which change over its life and it is these changes which contain information as to the state of the component, e.g., whether failure of the component is impending. Usually components do not fail without warning. However, most such warnings are either not perceived or if perceived are not understood by the vehicle operator until the component actually fails and, in some cases, a breakdown of the vehicle occurs.

In accordance with the invention, each of these signals emitted by the vehicle components is converted into electrical signals and then digitized (i.e., the analog signal is converted into a digital signal) to create numerical time series data which is then entered into a processor. Pattern recognition algorithms then are applied in the processor to attempt to identify and classify patterns in this time series data. For a particular component, such as a tire for example, the algorithm attempts to determine from the relevant digital data whether the tire is functioning properly or whether it requires balancing, additional air, or perhaps replacement.

Frequently, the data entered into the computer needs to be preprocessed before being analyzed by a pattern recognition algorithm. The data from a wheel speed sensor, for example, might be used as is for determining whether a particular tire is operating abnormally in the event it is unbalanced, whereas the integral of the wheel speed data over a long time period (a preprocessing step), when compared to such sensors on different wheels, might be more useful in determining whether a particular tire is going flat and therefore needs air. In some cases, the frequencies present in a set of data is a better predictor of component failures than the data itself. For example, when a motor begins to fail due to worn bearings, certain characteristic frequencies began to appear. Moreover, the identification of which component is causing vibrations present in the vehicle structure can frequently be accomplished through a frequency analysis of the data. For these cases, a Fourier transformation of the data is made prior to entry of the data into a pattern recognition algorithm. Other mathematical transformations are also made for particular pattern recognition purposes in practicing the teachings of this invention. Some of these include shifting and combining data to determine phase changes, differentiating the data, filtering the data, and sampling the data. Also, there exists certain more sophisticated mathematical operations which attempt to extract or highlight specific features of the data. This invention contemplates the use of a variety of these preprocessing techniques and the choice of which ones is left to the skill of the practitioner designing a particular diagnostic module.

When a vehicle component begins to change its operating behavior, it is not always apparent from the particular sensors, if any, which are monitoring that component. The output from any one of these sensors can be normal even though the component is failing. By analyzing the output of a variety of sensors, however, the pending failure can be diagnosed. For example, the rate of temperature rise in the vehicle coolant, if it were monitored, might appear normal unless it were known that the vehicle was idling and not traveling down a highway at a high speed. Even the level of coolant temperature which is in the normal range could be in fact abnormal in some situations signifying a failing coolant pump, for example, but not detectable from the coolant thermometer alone.

Figure 1:
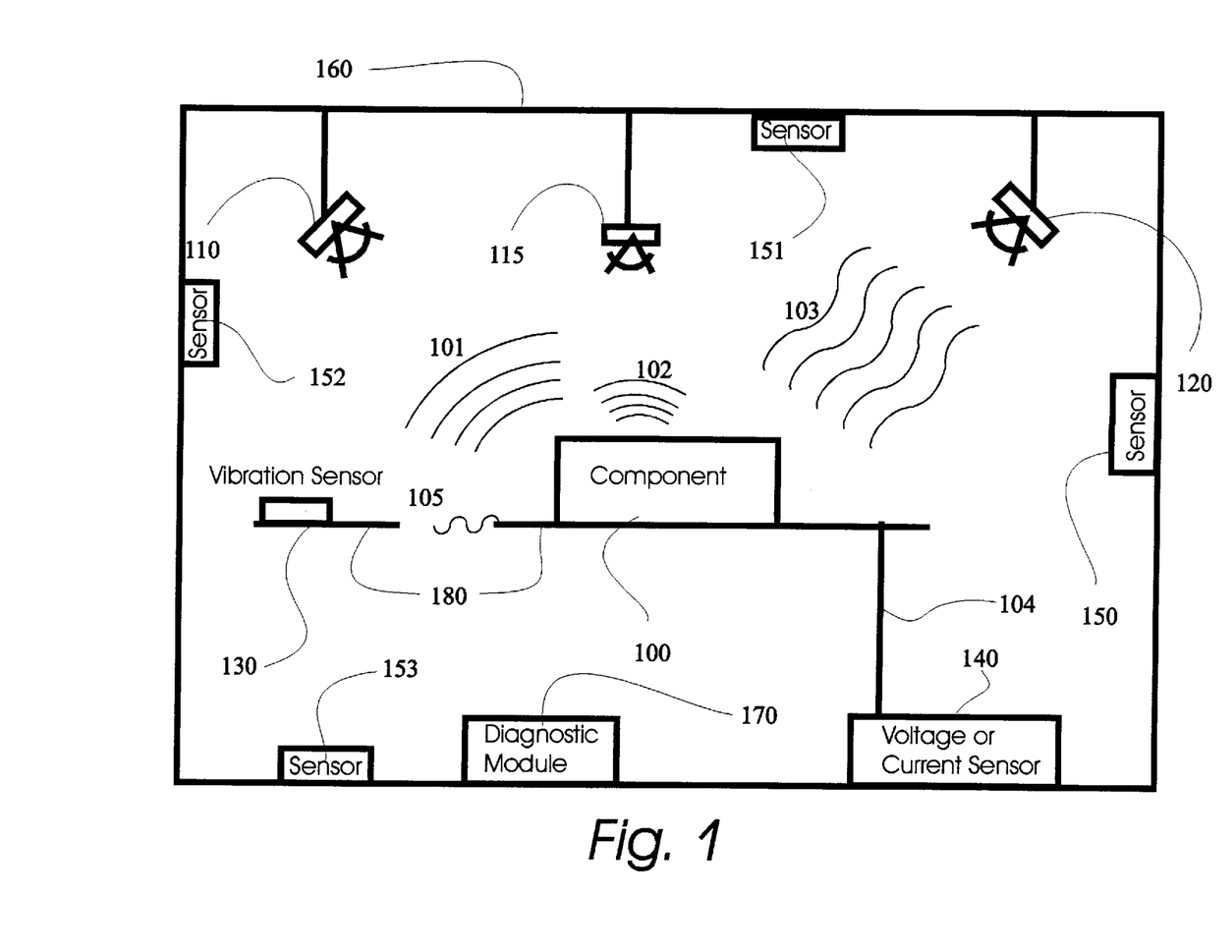
FIG. 1 is a schematic illustration of a generalized component with several signals being emitted and transmitted along a variety of paths, sensed by a variety of sensors and analyzed by the diagnostic module in accordance with the invention.

In FIG. 1, a generalized component 100 emitting several signals which are transmitted along a variety of paths, sensed by a variety of sensors and analyzed by the diagnostic device in accordance with the invention is illustrated schematically. Component 100 is mounted to a vehicle 180 and during operation it emits a variety of signals such as acoustic 101, electromagnetic radiation 102, thermal radiation 103, current and voltage fluctuations in conductor 104 and mechanical vibrations 105. Various sensors are mounted in the vehicle to detect the signals emitted by the component 100. These include a vibration sensor 130 also mounted to the vehicle, acoustic sensor 110, electromagnetic radiation sensor 115, heat radiation sensor 120, and voltage or current sensor 140. In addition, various other sensors 150, 151, 152, 153 measure other parameters of other components which in some manner provide information directly or indirectly on the operation of component 100. All of the sensors illustrated on FIG. 1 are connected to a data bus 160. A diagnostic module 170, in accordance with the invention, is also attached to the vehicle data bus 160 and receives the signals generated by the various sensors.

As shown in FIG. 1, the diagnostic module 170 has access to the output data of each of the sensors which have information relative to the component 100. This data appears as a series of numerical values each corresponding to a measured value at a specific point in time. The cumulative data from a particular sensor is called a time series of individual data points. The diagnostic module 170 compares the patterns of data received from each sensor individually, or in combination with data from other sensors, with patterns for which the diagnostic module has been trained to determine whether the component is functioning normally or abnormally.

Central to this invention is the manner in which the diagnostic module 170 determines a normal pattern from an abnormal pattern and the manner in which it decides what data to use from the vast amount of data available. This is accomplished using pattern recognition technologies such as artificial neural networks and training. The theory of neural networks including many examples can be found in several books on the subject including: *Techniques And Application Of Neural Networks,* edited by Taylor, M. and Lisboa, P., Ellis Horwood, West Sussex, England, 1993; *Naturally Intelligent Systems,* by Caudill, M. and Butler, C., MIT Press, Cambridge Mass. 1990; J. M. Zaruda, *Introduction to Artificial Neural Systems,* West publishing Co., N.Y., 1992 and, *Digital Neural Networks,* by Kung, S. Y., PTR Prentice Hall, Englewood Cliffs, N.J., 1993, all of which are included herein by reference. The neural network pattern recognition technology is one of the most developed of pattern recognition technologies. Newer and more efficient systems are now being developed such as the neural network system which is being developed by Motorola and is described in U.S. Pat. No. 5,390,136 and patent application Ser. No. 08/76,602. The neural network will be used here to illustrate one example of a pattern recognition technology but it is emphasized that this invention is not limited to neural networks. Rather, the invention may apply any known pattern recognition technology. A brief description of the neural network pattern recognition technology is set forth below.

Neural networks are constructed of processing elements known as neurons that are interconnected using information channels call interconnects. Each neuron can have multiple inputs but only one output. Each output however is connected to all other neurons in the next layer. The neurons in the first layer operate collectively on the input data as described in more detail below. Neural networks learn by extracting relational information from the data and the desired output. Neural networks have been applied to a wide variety of pattern recognition problems including speech recognition, optical character recognition, and handwriting analysis.

To train a neural network, data is provided in the form of one or more time series which represents the condition to be diagnosed as well as normal operation. As an example, the simple case of an out of balance tire will be used. Various sensors on the vehicle are used to extract information from signals emitted by the tire such as the airbag accelerometer, a torque sensor on the steering wheel or the pressure output of the power steering system. Other sensors which might not have an obvious relationship to tire unbalance are also included such as, for example, the vehicle speed or wheel speed. Data is taken from a variety of vehicles where the tires were accurately balanced under a variety of operating conditions also for cases where varying amounts of unbalance was intentionally introduced. Once the data had been collected, some degree of preprocessing is usually performed to reduce the total amount of data fed to the neural network. In the case of the unbalanced tire, the time period between data points might be chosen such that there are at least ten data points per revolution of the wheel. For some other application, the time period might be one minute or one millisecond.

Once the data has been collected, it is processed by a neural network generating program, for example, if a neural network pattern recognition system is to be used. Such programs are available commercially, e.g., from NeuralWare of Pittsburgh, Pa. The program proceeds in a trial and error manner until it successfully associates the various patterns representative of abnormal behavior, an unbalanced tire, with that condition. The resulting neural network can be tested to determine if some of the input data from some of the sensors, for example, can be eliminated. In this way, the engineer can determine what sensor data is relevant to a particular diagnostic problem. The program then generates an algorithm which is programmed onto a microprocessor. Such a microprocessor appears inside the diagnostic module 170 in FIG. 1. Once trained, the neural network, as represented by the algorithm, will now recognize an unbalanced tire on a vehicle when this event occurs. At that time, when the tire is unbalanced, the diagnostic module 170 will output a message to the driver indicating that the tire should be now be balanced as described in more detail below. The message to the driver is provided by output means coupled to or incorporated within the module 170 and may be, e.g., a light on the dashboard, a vocal tone or any other recognizable indication apparatus.

Discussions on the operation of a neural network can be found in the above references on the subject and are well understood by those skilled in the art. Neural networks are the most well known of the pattern recognition technologies based on training, although neural networks have only recently received widespread attention and have been applied to only very limited and specialized problems in motor vehicles. Other non-training based pattern recognition technologies exist, such as fuzzy logic. However, the programming required to use fuzzy logic, where the patterns must be determine by the programmer, render these systems impractical for general vehicle diagnostic problems such as described herein. Therefore, preferably the pattern recognition systems which learn by training are used herein.

The neural network is the first highly successful of what will be a variety of pattern recognition techniques based on training. There is nothing which suggests that it is the only or even the best technology. The characteristics of all of these technologies which render them applicable to this general diagnostic problem include the use of time-based input data and that they are trainable. In all cases, the pattern recognition technology learns from examples of data characteristic of normal and abnormal component operation.

Figure 2:
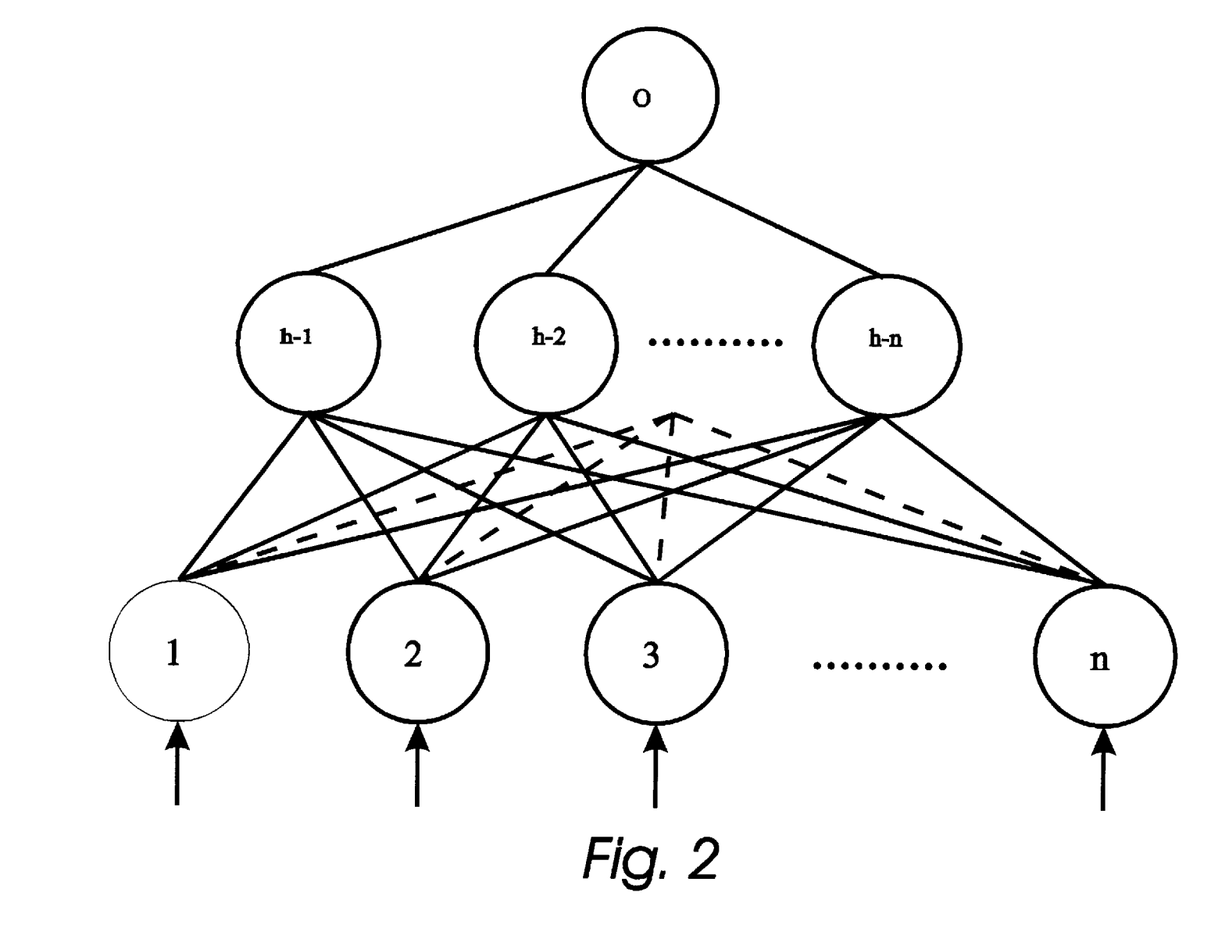
FIG. 2 is a schematic of one pattern recognition methodology known as a neural network.

A diagram of one example of a neural network used for diagnosing an unbalanced tire, for example, based on the teachings of this invention is shown in FIG. 2. The process can be programmed to periodically test for an unbalanced tire. Since this need be done only infrequently, the same processor can be used for many such diagnostic problems. When the particular diagnostic test is run, data from the previously determined relevant sensors is preprocessed and analyzed with the neural network algorithm. For the unbalanced tire, using the data from the crash accelerometer, the digital acceleration values from the analog to digital converter in the crash sensor are entered into nodes 1 through n and the neural network algorithm compares the pattern of values on nodes 1 through n with patterns for which it has been trained as follows.

Each of the input nodes is connected to each of the second layer nodes, $h\text{-}1, h\text{-}2, \ldots, h\text{-}n$, called the hidden layer, either electrically as in the case of a neural computer, or through mathematical functions containing multiplying coefficients called weights, in the manner described in more detail in the above references. At each hidden layer node, a summation occurs of the values from each of the input layer nodes, which have been operated on by functions containing the weights, to create a node value. Similarly, the hidden layer nodes are in like manner connected to the output layer node(s), which in this example is only a single node O representing the decision to notify the driver of the unbalanced tire. During the training phase, an output node value of 1, for example, is assigned to indicate that the driver should be notified and a value of 0 is assigned to not doing so. Once again, the details of this process are described in above-referenced texts and will not be presented in detail here.

In the example above, twenty input nodes were used, five hidden layer nodes and one output layer node. In this example, only one sensor was considered and accelerations from only one direction were used. If other data from other sensors such as accelerations from the vertical or lateral directions were also used, then the number of input layer nodes would increase. Again, the theory for determining the complexity of a neural network for a particular application has been the subject of many technical papers and will not be presented in detail here. Determining the requisite complexity for the example presented here can be accomplished by those skilled in the art of neural network design.

Briefly, the neural network described above defines a method, using a pattern recognition system, of sensing an unbalanced tire and determining whether to notify the driver and comprises the steps of (a) obtaining an acceleration signal from an accelerometer mounted on a vehicle;

(b) converting the acceleration signal into a digital time series;

(c) entering the digital time series data into the input nodes of the neural network;

(d) performing a mathematical operation on the data from each of the input nodes and inputting the operated on data into a second series of nodes wherein the operation performed on each of the input node data prior to inputting the operated on value to a second series node is different from that operation performed on some other input node data;

(e) combining the operated on data from all of the input nodes into each second series node to form a value at each second series node;

(f) performing a mathematical operation on each of the values on the second series of nodes and inputting this operated on data into an output series of nodes wherein the operation performed on each of the second series node data prior to inputting the operated on value to an output series node is different from that operation performed on some other second series node data;

(g) combining the operated on data from all of the second series nodes into each output series node to form a value at each output series node; and, (h) notifying a driver if the value on one output series node is within a chosen range signifying that a tire requires balancing.

This method can be generalized to a method of predicting that a component of a vehicle will fail comprising the steps of:

(a) sensing a signal emitted from the component;

(b) converting the sensed signal into a digital time series;

(c) entering the digital time series data into a pattern recognition algorithm;

(d) executing the pattern recognition algorithm to determine if there exists within the digital time series data a pattern characteristic of abnormal operation of the component; and (e) notifying a driver if the abnormal pattern is recognized.

The particular neural network described and illustrated above contains a single series of hidden layer nodes. In some network designs, more than one hidden layer is used, although only rarely will more than two such layers appear. There are of course many other variations of the neural network architecture illustrated above which appear in the referenced literature. For the purposes herein, therefore, "neural network" will be defined as a system wherein the data to be processed is separated into discrete values which are then operated on and combined in at least a two stage process and where the operation performed on the data at each stage is in general different for each discrete value and where the operation performed is at least determined through a training process.

The implementation of neural networks can take on at least two forms, an algorithm programmed on a digital microprocessor or in a neural computer. In this regard, it is noted that neural computer chips are now becoming available.

In the example above, only a single component failure was discussed using only a single sensor. The diagnostic module 170 contains preprocessing and neural network algorithms for a number of component failures. The neural network algorithms are generally relatively simple, requiring only a few lines of computer code. A single general neural network program can be used for multiple pattern recognition cases by specifying different coefficients for the various terms, one set for each application. Thus, adding different diagnostic checks has only a small affect on the cost of the system. Also, the system has available to it all of the information available on the data bus. During the training process, the pattern recognition program sorts out from the available vehicle data on the data bus, those patterns which predict failure of a particular component.

Figure 3:
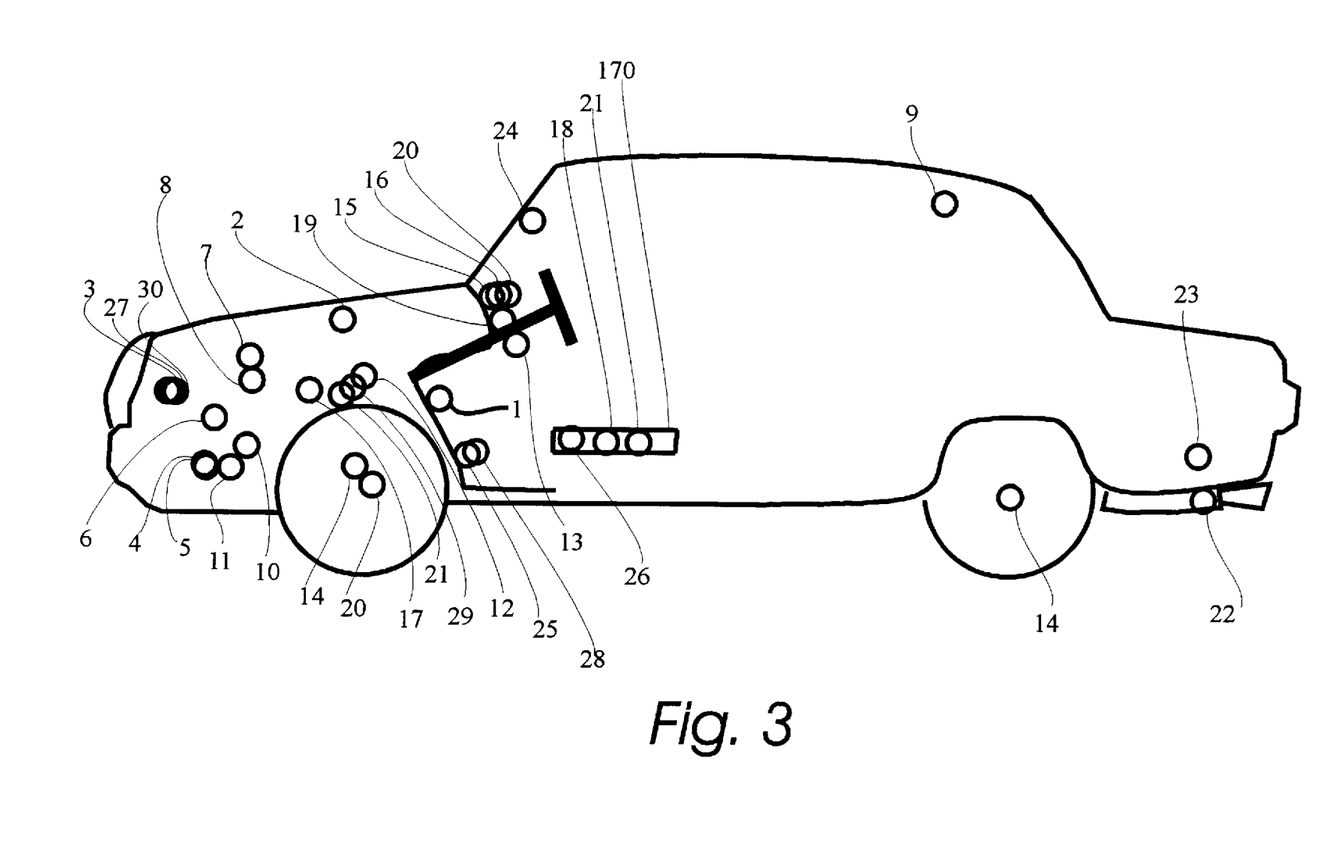
FIG. 3 is a schematic of a vehicle with several components and several sensors and a total vehicle diagnostic system in accordance with the invention utilizing a diagnostic module in accordance with the invention.
Figure 4:
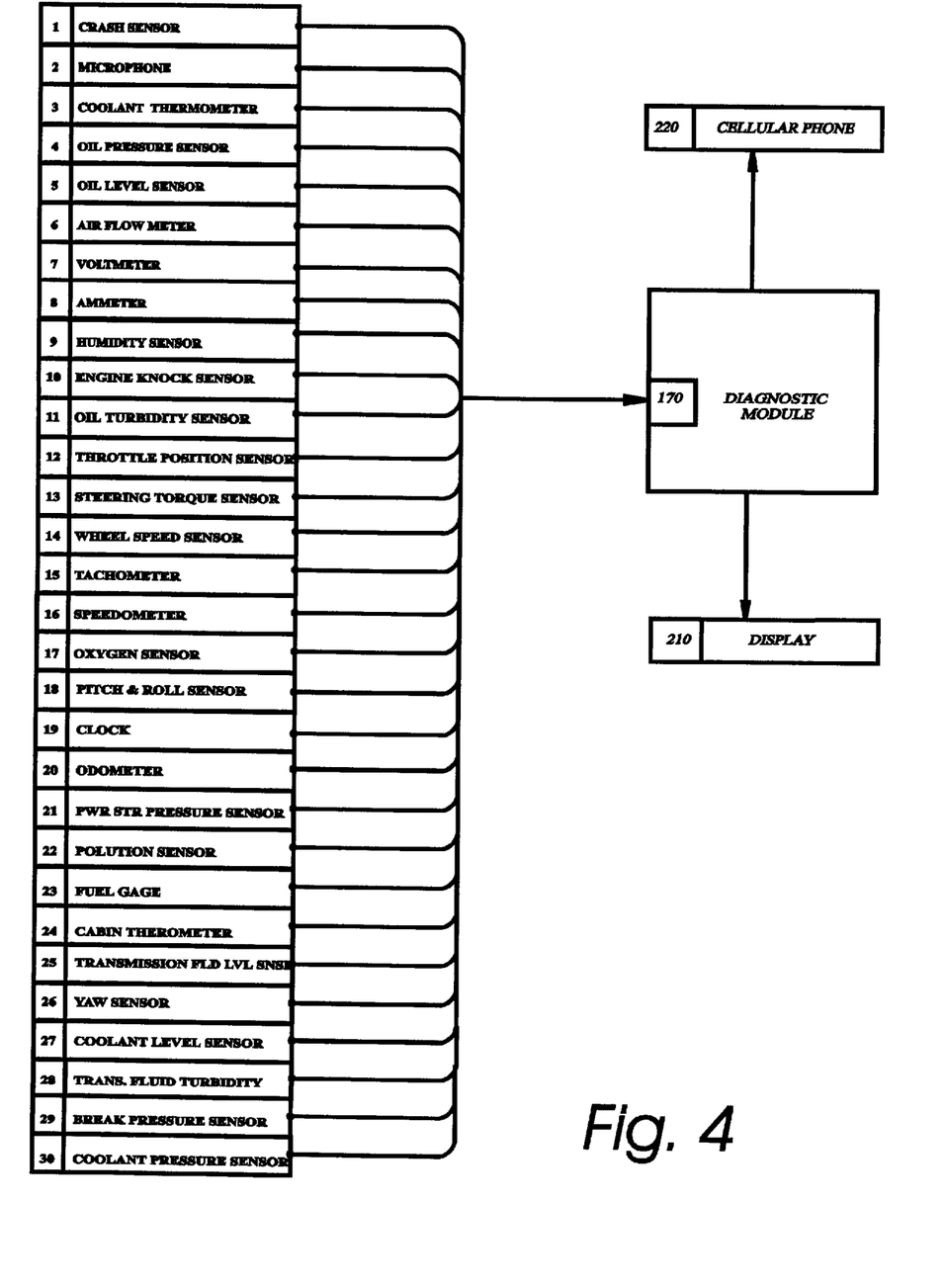
FIG. 4 is a flow diagram of information flowing from various sensors onto the vehicle data bus and thereby into the diagnostic module in accordance with the invention with outputs to a display for notifying the driver, and to the vehicle cellular phone for notifying another person, of a potential component failure.

In FIG. 3, a schematic of a vehicle with several components and several sensors is shown in their approximate locations on a vehicle along with a total vehicle diagnostic system in accordance with the invention utilizing a diagnostic module in accordance with the invention. A flow diagram of information passing from the various sensors shown on FIG. 3 onto the vehicle data bus and thereby into the diagnostic device in accordance with the invention is shown in FIG. 4 along with outputs to a display for notifying the driver and to the vehicle cellular phone for notifying the dealer, vehicle manufacturer or other entity concerned with the failure of a component in the vehicle. FIG. 4 also contains the names of the sensors shown numbered on FIG. 3.

Sensor 1 is a crash sensor having an accelerometer, sensor 2 is a microphone, sensor 3 is a coolant thermometer, sensor 4 is an oil pressure sensor, sensor 5 is an oil level sensor, sensor 6 is an air flow meter, sensor 7 is a voltmeter, sensor 8 is an ammeter, sensor 9 is a humidity sensor, sensor 10 is an engine knock sensor, sensor 11 is an oil turbidity sensor, sensor 12 is a throttle position sensor, sensor 13 is a steering torque sensor, sensor 14 is a wheel speed sensor, sensor 15 is a tachometer, sensor 16 is a speedometer, sensor 17 is an oxygen sensor, sensor 18 is a pitch/roll sensor, sensor 19 is a clock, sensor 20 is an odometer, sensor 21 is a power steering pressure sensor, sensor 22 is a pollution sensor, sensor 23 is a fuel gauge, sensor 24 is a cabin thermometer, sensor 25 is a transmission fluid level sensor, sensor 26 is a yaw sensor, sensor 27 is a coolant level sensor, sensor 28 is a transmission fluid turbidity sensor, sensor 29 is brake pressure sensor and sensor 30 is a coolant pressure sensor. Other possible sensors include a temperature transducer, a pressure transducer, a liquid level sensor, a flow meter, a position sensor, a velocity sensor, a RPM sensor, a chemical sensor and an angle sensor.

Consider now some examples. The following is a partial list of potential component failures and the sensors from the list on FIG. 4 which might provide information to predict the failure of the component:

Out of balance tires 1,13,14,15,20,21

Front end out of alignment 1,13,21,26

Tune up required 1,3,10,12,15,17,20,22

Oil change needed 3,4,5,11

Motor failure 1,2,3,4,5,6,10,12,15,17,22

Low tire pressure 1,13,14,15,20,21

Front end looseness 1,13,16,21,26

Cooling system failure 3,15,24,27,30

Alternator problems 1,2,7,8,15,19,20

Transmission problems 1,3,12,15,16,20,25,28

Differential problems 1,12,14

Brakes 1,2,14,18,20,26,29

Catalytic converter and muffler 1,2,12,15,22

Ignition 1,2,7,8,9,10,12,17,23

Tire wear 1,13,14,15,18,20,21,26

Fuel leakage 20,23

Fan belt slippage 1,2,3,7,8,12,15,19,20

Alternator deterioration 1,2,7,8,15,19

Coolant pump failure 1,2,3,24,27,30

Coolant hose failure 1,2,3,27,30

Starter failure 1,2,7,8,9,12,15

Dirty air filter 2,3,6,11,12,17,22

Several interesting facts can be deduced from a review of the above list. First, all of the failure modes listed can be at least partially sensed by multiple sensors. In many cases, some of the sensors merely add information to aid in the interpretation of signals received from other sensors. In today's automobile, there are few if any cases where multiple sensors are used to diagnose or predict a problem. In fact, there is virtually no failure prediction undertaken at all. Second, many of the failure modes listed require information from more than one sensor. Third, information for many of the failure modes listed can not be obtained by observing one data point in time as is now done by most vehicle sensors. Usually an analysis of the variation in a parameter as a function of time is necessary. In fact, the association of data with time to create a temporal pattern for use in diagnosing component failures in automobile is unique to this invention. Fourth, the vibration measuring capability of the airbag crash sensor is useful for most of the cases discussed above yet there is no such current use of this sensor. The airbag crash sensor is used only to detect crashes of the vehicle. Fifth, the second most used sensor in the above list, a microphone, does not currently appear on any automobiles yet sound is the signal most often used by vehicle operators and mechanics to diagnose vehicle problems. Another sensor which is listed above which also does not currently appear on automobiles is a pollution sensor. This is typically a chemical sensor mounted in the exhaust system for detecting emissions from the vehicle. It is expected that this and other chemical sensors will be used in the future.

In addition, from the foregoing depiction of different sensors which receive signals from a plurality of components, it is possible for a single sensor to receive and output signals from a plurality of components which are then analyzed by the processor to determine if any one of the components for which the received signals were obtained by that sensor is operating in an abnormal state. Likewise, it is also possible to provide for a multiplicity of sensors each receiving a different signal related to a specific component which are then analyzed by the processor to determine if that component is operating in an abnormal state.

The discussion above has centered on notifying the vehicle operator of a pending problem with a vehicle component. Today, there is great competition in the automobile marketplace and the manufacturers and dealers who are most responsive to customers are likely to benefit by increased sales both from repeat purchasers and new customers. The diagnostic module disclosed herein benefits the dealer by making him instantly aware, through the cellular telephone system coupled to the diagnostic module or system in accordance with the invention, when a component is likely to fail. As envisioned, on some automobiles, when the diagnostic module 170 detects a potential failure it not only notifies the driver through a display 210, but also automatically notifies the dealer through a vehicle cellular phone 220. The dealer can thus phone the vehicle owner and schedule an appointment to undertake the necessary repair at each parties mutual convenience. The customer is pleased since a potential vehicle breakdown has been avoided and the dealer is pleased since he is likely to perform the repair work t. The vehicle manufacturer also benefits by early and accurate statistics on the failure rate of vehicle components. This early warning system can reduce the cost of a potential recall for components having design defects. The vehicle manufacturer will thus be guided toward producing higher quality vehicles thus improving his competitiveness. Finally, experience with this system will actually lead to a reduction in the number of sensors on the vehicle since only those sensors which are successful in predicting failures will be necessary.

For most cases it is sufficient to notify a driver that a component is about to fail through a warning display. In some critical cases, action beyond warning the driver may be required. If, for example, the diagnostic module detected that the alternator was beginning to fail, in addition to warning the driver of this eventuality, the module could send a signal to another vehicle system to turn off all non-essential devices which use electricity thereby conserving electrical energy and maximizing the time and distance that the vehicle can travel before exhausting the energy in the battery.

In the discussion above, the diagnostic module of this invention assumes that a vehicle data bus exists which is used by all of the relevant sensors on the vehicle. Most vehicles today do not have a data bus although it is widely believed that most vehicles will have one in the near future. Naturally, the relevant signals can be transmitted to the diagnostic module through a variety of coupling means other than through a data bus and this invention is not limited to vehicles having a data bus.

As can be appreciated from the above discussion, the invention described herein brings several new improvements to automobiles including, but not limited to, the use of pattern recognition technologies to diagnose potential vehicle component failures, the use of trainable systems thereby eliminating the need of complex and extensive programming, the simultaneous use of multiple sensors to monitor a particular component, the use of a single sensor to monitor the operation of many vehicle components, the monitoring of vehicle components which have no dedicated sensors, and the notification of both the driver and possibly an outside entity of a potential component failure in time so that the failure can be averted and vehicle breakdowns substantially eliminated.

Although several preferred embodiments are illustrated and described above, there are possible combinations using other signals and sensors for the components and different forms of the neural network implementation or different pattern recognition technologies that perform the same functions which can be utilized in accordance with the invention. Also, although the neural network has been described as an example of one means of pattern recognition, other pattern recognition means exist and still others are being developed which can be used to identify potential component failures by comparing the operation of a component over time with patterns characteristic of normal and abnormal component operation. In addition, with the pattern recognition system described above, the input data to the system may be data which has been pre-processed rather than the raw signal data either through a process called "feature extraction" or by various mathematical transformations. This invention is not limited to the above embodiments and should be determined by the following claims.

What is claimed is:

1. In a motor vehicle having at least one component, said at least one component emitting a signal having a pattern containing information as to whether said at least one component is operating normally or abnormally, a component diagnostic system for diagnosing said at least one component comprising:

a) sensor means for sensing said signal having said pattern containing information as to whether said at least one component is operating normally or abnormally and outputting and electrical signal corresponding to said pattern containing information as to whether said at least one component is operating normally or abnormally;

b) processor means coupled to said sensor means for processing said electrical signal and determining if said pattern is characteristic of abnormal state of operation of said at least one component, said processor means comprising pattern recognition means; and, c) output means coupled to said processor means for affecting another system within said vehicle if said at least one component is operating abnormally, said another system comprising a display for indicating the abnormality of said at least one component, said display being arranged in a position in the vehicle to enable a driver of the vehicle to view said display and thus the indicated abnormality of said at least one component.

2. The system in accordance with claim 1, wherein said sensor means comprises a plurality of sensors, each of said sensors being selected from the group consisting of an accelerometer, a temperature transducer, a pressure transducer, a liquid level sensor, a flow meter, a voltage meter, a current meter, a humidity sensor, an engine knock sensor, a fluid turbidity sensor, a torque sensor, a position sensor, a wheel speed sensor, a velocity sensor, an RPM sensor, a chemical sensor, a clock, an odometer and an angle sensor.

3. The system in accordance with claim 2, wherein said sensor is an accelerometer, said accelerometer constituting a part of the vehicle crash sensor system.

4. The system in accordance with claim 1, wherein said sensor means comprises a microphone connected to said vehicle and not directly associated with said at least one component.

5. The system in accordance with claim 1, wherein said pattern recognition means is a neural network.

6. The system in accordance with claim 5, wherein said neural network is an algorithm determined by a neural network computer program.

7. The system in accordance with claim 1, wherein said vehicle further comprises at least one source of additional information and input means coupled to said vehicle for inputting said additional information into said processor means.

8. The system in accordance with claim 7, wherein said additional information is at least one of the current time and date.

9. The system in accordance with claim 1, wherein said another system further comprises transmission means for transmitting information related to the abnormality of said at least one component to a site remote from said vehicle.

10. The system in accordance with claim 9, wherein said remote site is a vehicle repair facility.

11. The system in accordance with claim 1, wherein said sensor means comprise a plurality of sensors, at least one of said sensors being a sensor not directly associated with said at least one component.

12. The system in accordance with claim 1, wherein said sensor means comprises a plurality of sensors coupled to a vehicle data bus, said processor means being coupled to said vehicle data bus.

13. In a motor vehicle having at least one component providing a time varying signal having a temporal pattern, said pattern containing information as to the state of operation of said at least one component, a component diagnostic system for diagnosing said at least one component comprising:

a) sensor means for sensing said time varying signal having the temporal pattern containing information as to the state operation of said least one component and converting said time varying signal having the temporal pattern containing information as to the state of operation of said at least one component into a time varying electrical signal;

b) processor means coupled to said sensor means for processing said time varying electrical signal and for determining if said temporal pattern of said time varying signal is characteristic of normal operation of said at least one component, said processor means comprising pattern recognition means; and, c) output means coupled to said processor means for affecting another system within said vehicle if said temporal pattern is not characteristic of normal operation of said at least one component, said another system comprising a display for indicating the abnormal operation of said at least one component, said display being arranged in a position in the vehicle to enable a driver of the vehicle to view said display and thus the indicated abnormal operation of said at least one component.

14. The system in accordance with claim 13 wherein said processor means comprise a pattern recognition algorithm derived from training.

15. The system in accordance with claim 13 wherein said electrical signal is a digital electrical signal; said processor means processing said digital electrical signal to produce a time series of discrete data values comprising said pattern and determining if said pattern is characteristic of normal operation of said at least one component, said processor means comprising an algorithm which combines said time series data with other information to produce a result indicative of the state of operation of said at least one component.

16. A method for predicting that a component of a vehicle will fail, comprising the steps of:

(a) sensing a signal emitted from said component;

(b) converting said signal into a digital time series;

(c) entering the digital time series data into a pattern recognition algorithm;

(d) executing said pattern recognition algorithm to determine if there exists within said digital time series data a pattern characteristic of abnormal operation of said component; and (e) notifying a driver of the vehicle if said abnormal pattern is recognized by displaying an indicia of the abnormal operation of said component on a display arranged on the vehicle and viewable to the driver.

17. In a motor vehicle having at least one component, a component diagnostic system for diagnosing said at least one component comprising:

a) sensor means coupled to said vehicle and comprising at least one sensor not directly associated with said at least one component each of said at least one sensor sensing a signal having a pattern containing information as to whether said at least one component is operating abnormally and outputting an electrical signal containing said pattern containing information as to whether said at least one component is operating abnormally;

b) processor means coupled to said at least one sensor for processing said respective signal and for determining if said pattern is characteristic of abnormal state of operation of said at least one component, said processor means comprising a pattern recognition algorithm; and, c) output means coupled to said processor means for affecting another system within said vehicle if said at least one component is operating abnormally, said another system comprising a display for indicating the abnormal state of operation of said at least one component, said display being arranged in a position in the vehicle to enable a driver of the vehicle to view said display and thus the indicated abnormal operation of said at least one component.

18. The system of claim 17, wherein said at least one sensor not directly associated with said at least one component comprises at least two different sensors, each of said at least two sensors sensing said signal and outputting an electrical signal corresponding to said pattern, said processor means receiving and processing said electrical signals output by said at least two sensors and based on said electrical signals output by said at least two sensors, determining if said pattern is characteristic of abnormal state of operation of said component.

19. The system of claim 17, wherein said at least one component comprises two unrelated components, each of said components emitting a signal having a pattern containing information as to whether said component is operating abnormally, said at least one sensor comprising a single sensor for sensing both of said signals and outputting electrical signals corresponding to said patterns, said processor means processing both of said electrical signals and determining if said patterns are characteristic of abnormal state of operation of a respective one of said components.

20. The system in accordance with claim 17, wherein said at least one sensor comprises a plurality of sensors not directly associated with said at least one component, all of said sensors being coupled to a vehicle data bus, said processor means being coupled to said vehicle data bus.

\* \* \* \* \*